United States Patent Office 3,814,615
Patented June 4, 1974

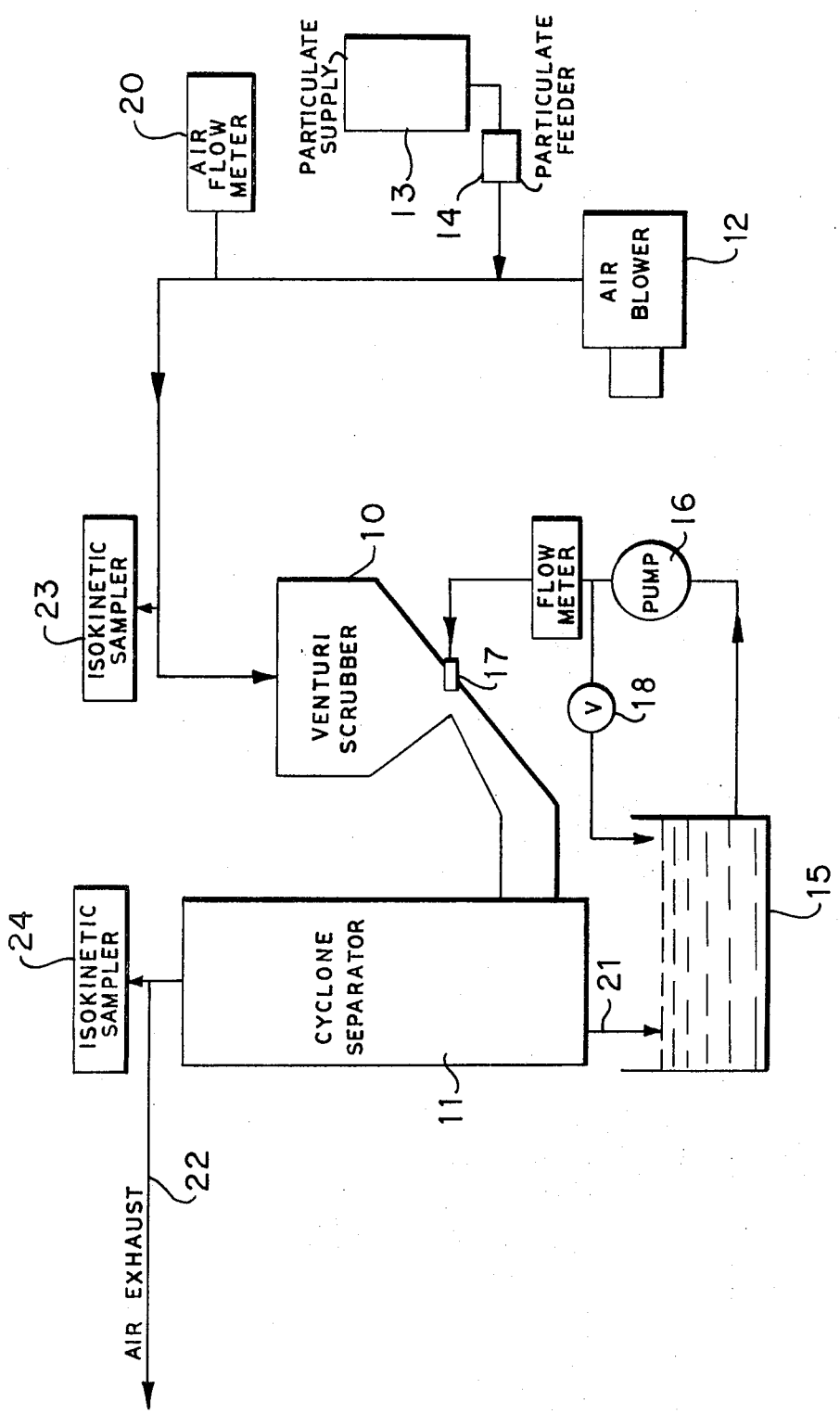

3,814,615
REMOVAL OF PARTICULATE MATTER FROM GASEOUS WASTES BY WET COLLECTORS
Martin Prince, Wayne, N.J., and Hillard Blanck, Floral Park, and Gregorio Tarancon, Astoria, N.Y., assignors to Saleen Development Corp., New York, N.Y.
Continuation-in-part of abandoned application Ser. No. 52,457, July 6, 1970. This application Apr. 26, 1972, Ser. No. 247,526
Int. Cl. C08b 25/02, 27/22
U.S. Cl. 106—213     12 Claims

ABSTRACT OF THE DISCLOSURE

In the removal of particulate matter from gaseous wastes by wet collectors, such as venturi scrubbers, the liquid employed to achieve such removal is water, or an aqueous slurry of the particulate matter, with an additive dissolved therein to substantially improve the collection of the particulate matter thereby, especially when the loading of the gases with such matter is very small. The additive used has, as its essential constituents, a preferably reactive mixture of an alkyl or dialkyl-phenyl polyethoxy alcohol, an N-substituted acid amide and an ethoxylated fatty alcohol, and one or more starches, preferably also with the addition of a salt.

---

This invention relates generally to the removal of particulate matter from gaseous wastes by wet collectors, and is particularly directed to improving the effectiveness of the collection liquid used in such wet collectors for the removal of particulate matter from gaseous wastes. This application is a continuation-in-part of our pending U.S. patent application Ser. No. 52,457, filed July 6, 1970, now abandoned, and of our pending U.S. patent application Ser. No. 92,410, and which has issued on June 6, 1972 as U.S. Pat. No. 3,667,191.

Wet collectors of the types to which this invention relates are generally classified as chamber scrubbers, cyclonic scrubbers, inertial scrubbers and mechanical scrubbers, for example, as categorized in the report entitled "Removal of Particulate Matter from Gaseous Wastes," published 1961, by the American Petroleum Institute, 1271 Avenue of the Americas, New York, N.Y. In all of such wet collectors, the collection or scrubbing liquid is broken up into a spray which contacts the particle-laden gas, and the invention has particularly advantageous application to inertial scrubbers of the venturi scrubber type in which the energy of the particle-laden gas stream is primarily used to expand the surface area of the scrubbing liquid for effective contact.

In industrial venturi scrubbers, the particle-laden air or other gas is drawn or blown through the venturi, and the scrubbing liquid, usually water, is injected into, or just ahead of the venturi throat under low pressure and is distributed, as by a spray nozzle or nozzles or by weir boxes, to provide a curtain of the liquid across the throat where the gas velocity is high. In the venturi, the high velocity gas disrupts the liquid into drops which are rapidly accelerated, but since initially there is a high differential velocity between the drops and the particulate matter borne by the gas, collection by impaction takes place. The scrubbing liquid having the particulate matter entrapped therein is then separated from the cleaned gas, as in a cyclone separator. In the operation of venturi scrubbers, the liquid/gas flow rate ratio, the gas velocity and the pressure drop are among the operating conditions that may be varied. Generally speaking, an increase in the gas velocity achieves an increase in the particle collection efficiency, that is, in the percentage of the gas-borne particles that are collected by the scrubbing liquid. However, such an increase in the gas velocity is achieved at the cost of an increased power consumption for drawing or blowing the gas through the venturi. Further, there is an optimum range within which the liquid/gas flow rate ratio should reside for maximum particle collection efficiency. However, if the consumption of water used as the scrubbing liquid is to be minimized, it may be desirable to employ a liquid/gas flow ratio that is below the optimum range therefor.

It is an object of this invention to improve the particle collection by the scrubbing liquid in wet collectors, particularly of the venturi scrubber type, so as to make possible an increase in the particle collection efficiency, that is, an increase in the fraction of the gas-borne particles that are collected, or to permit a decrease in the power consumed for operation of the venturi scrubber, or in the quantity of water employed as the scrubbing liquid, for achieving a desired particle collection efficiency.

Another object is to improve particle collection by venturi scrubbers, as aforesaid, without requiring major changes or alterations in existing installations of such devices.

A further object is to provide improved particle collection by venturi scrubbers in an economically feasible manner.

Although there have been numerous studies of the mechanisms involved in the operation of venturi scrubbers, little or nothing has been previously learned with respect to the characteristics of the scrubbing liquid that importantly affect the particle collection in venturi scrubbers. Accordingly, the experimental and theoretical investigations leading to the present invention have involved studies of the influence on particle collection in wet collectors, and particularly in venturi scrubbers, of various characteristics of the scrubbing liquid. Since water is the most readily available and cheapest of liquids suitable for use as the scrubbing liquid, the mentioned investigations have been mainly concerned with the possibility of modifying characteristics of water, as by including additives therein in economically feasible amounts, so as to improve the particle collection by wet collectors, especially of the venturi scrubber type.

In the operation of low energy devices for removing gas-borne particles by washing, for example, in the operation of spray towers, it has been suggested to add wetting agents to the spray water with the expectation that the resulting reduced surface tension of the relatively large spray droplets obtained in such low-energy devices will facilitate the contact of fine particles with such droplets. However, it has been found that, when wetting agents or surfactants are added to the water used as the scrubbing liquid in venturi scrubbers, which are so-called high-energy devices, the addition of surfactants may or may not increase the particle collection efficiency and, surprisingly, may even result in a reduction of the particle collection efficiency. Further, when the scrubbing liquid is recirculated to minimize the consumption of water and of any additive provided therein to improve collection of particulate matter, the particulate matter contained in the recirculated scrubbing liquid may absorb the additives previously proporsed for use in low-energy wet collectors and thereby render the additive ineffective to increase particle collection by the recirculated liquid.

Of course, it has been the practice to recirculate the scrubbing liquid used in wet collectors, so that such scrubbing liquid necessarily is a slurry or solution in water of the particulate matter being removed from a gas stream. Thus, for example, the April 1966 issue of Chemical Engineering Progress (Vol. 62, No. 4), at pages 51–54, discloses process equipment for the manufacture of dry starch and in which the finished product is collected by cyclones, and the gas streams from the cyclones are passed through a gas scrubber for removal of the residual starch from such gas streams. Since starch is the particulate matter to be removed from the gas streams by the gas scrubber, the recirculated scrubbing liquid used in the latter is necessarily a water-starch slurry. However, neither the foregoing article nor any other prior art has ever suggested that the addition to the scrubbing water of starch, either alone or with other additives as hereinafter described, is effective to increase the collection efficiency of the gas scrubber in respect to either the collection of starch particles or any other particulate matter.

We have found, surprisingly, that particle collection by wet collectors, particularly of the venturi scrubber type, can be substantially improved beyond the levels previously considered possible, particularly with small particulate loadings in the gaseous wastes being treated, and that such improvement can be realized continuously or maintained even though the scrubbing liquid is recirculated, by employing, as the scrubbing liquid, water with economically feasible quantities of selected additives dissolved therein which do not substantially affect the surface tension of the liquid. More particularly, the additives dissolved in water to constitute the scrubbing liquids employed in accordance with this invention have as their essential constituents a mixture of an alkylphenyl polyethoxy alcohol, an N-substituted ethoxy amide of a fatty acid and an ethoxylated fatty alcohol, and one or more starches, which may be modified, for example, etherified or hydrolyzed, or salts of starches.

The starches thus employed according to this invention are desirably root starches, and preferably tapioca starch such as is extracted from the tuberous root of the manioc plant which is also known by other names, such as yucca in Central America, mandioca in South America and cassava in Africa and South East Asia. The proportion of starch in the water may vary over a wide range, for example, from at least 5 p.p.m. to as much as 5000 p.p.m., and is preferably in the range from 50 to 1000 p.p.m.

The additive included in the water used as the scrubbing liquid further preferably comprises a quantity of salt, the anion of which is either a halide, such as, fluoride, chloride, bromide or iodide, or a halogenoid or pseudo-halide, such as, cyanide (CN), thiocyanate (SCN), selenocyanate (SeCN), telluroxyanate (TeCN), azidodithiocarbonate (SCSN$_3$), cyanate (OCN), fulminate (ONC), azide (N$_3$), isothiocyanate (NCS) or isocyanate (NCO), or a sulfate or sulfite, or a nitrate or nitrate, and the cation of which is selected from Group I$a$ of the Periodic Table, such as, sodium, potassium and lithium, Group II$a$, such as, magnesium and calcium, Group II$b$, such as zinc, and Group III$b$, such as aluminum. Among the usable salts, as defined above, are Sodium Chloride (NaCl), Calcium Chloride (CaCl$_2$), Potassium Thiocyanate (KCNS), Sodium Sulfate and/or Sulfite (Na$_2$SO$_4$ and Na$_2$SO$_3$). The proportion of salt thus included in the additive to the water may be within the range given above for the starch and is preferably no greater than the proportion of starch employed.

In the component of the additive constituted by a mixture of an alkylphenyl polyethoxy alcohol, an N-substituted ethoxy amide of a fatty acid and an ethoxylated fatty alcohol, the ethoxylated fatty alcohol may comprise from ½ to 40 wt. percent of the mixture, and preferably from 1 to 30 wt. percent of the mixture, while the alkylphenyl polyethoxy alcohol and the N-substituted ethoxy amide of a fatty acid are present in the mixture in approximately equal molar amounts and preferably each comprise at least 35 wt. percent of the mixture. The amount of the described mixture in the additive to the water is preferably no greater than the proportion of starch employed and may be within the range of proportions given above for the starch itself.

The preferred alkylphenyl polyethoxy alcohols employed are those having the formula:

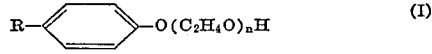     (I)

in which R represets C$_{8-9}$H$_{17-19}$ or C$_{12}$H$_{25}$ and $n$ has the numerical value of 4–12. Among commercially available alkylphenyl polyethoxy alcohols coming within the above definitions are: Igepal RC-520 (R=C$_{12}$H$_{25}$ and $n$=8–9), Igepal CO-530 (R=C$_9$H$_{19}$ and $n$=6) and Igepal CO-630 (R=C$_9$H$_{19}$ and $n$=9) available from GAF Corp., New York, N.Y.; Hyonic PE-120 (R=C$_9$H$_{19}$ and $n$=12) available from Nopco Chemical Div. of Diamond Shamrock Chemical Co., Newark, N.J.; Triton X-45 (R=C$_8$H$_{17}$ and $n$=5) and Triton N-57 (R=C$_9$H$_{19}$ and $n$=5) available from Rohm & Haas Co., Philadelphia, Pa.; and Neutronyx 626 (R=C$_9$H$_{19}$ and $n$=6) and Neutronyx 622 (R=C$_9$H$_{19}$ and $n$=4) available from Onyx Chemical Corp., Jersey City, N.J.

Among the preferred dialkylphenyl polyethoxy alcohols are those available commercially under the trade name Igepal DM430, DM530 nad DM710 from the GAF Corp.

The preferred N-substituted acid amides employed are those having the formulas:

     (II)

in which R—CO represents the acyl groups of coconut, lauric, methyl lauric or myristic acids or mixtures thereof; and

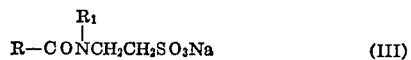     (III)

in which R—CO represents the acyl group of coconut, oleic, palmitic, tall oil or tallow acids, and R$_1$ represents a methyl or cyclohexyl group.

Among commercially available N-substituted amides of fatty acids coming within the definition of formula II are: Super Amide (R—CO=coconut acid) Super Amide L9 (R—CO=Lauric acid) and Super Amide L9C (R—CO=methyl lauric acid) available from Onyx Chemical Corp.; Syntol L-90 (R—CO=lauric acid) and Syntol LM-90 (R—CO=lauric and myristic acids) available from Drew Chemical Corporation, New York, N.Y.; and Hyonic LA-90 (R—CO=lauric acid) available from Nopco Chem. Div. of Diamond Shamrock Chemical Co.

Among commercially available N-substituted amides of fatty acids coming within the definition of formula III are:

Igepon T-73 (R—CO=oleic acid and R$_1$=methyl), Igepon TK-32 (R—CO=tall oil acid and R$_1$=methyl) and Igepon CN-42 (R—CO=palmitic acid and R$_1$=cyclohexyl) available from GAF Corp.

The preferred ethoxylated fatty alcohols are the terminated ethoxylated linear alcohol available under the trade name DF-16 from Rohm & Haas, the ethoxylated tridecyl alcohol [CH$_3$(CH$_2$)$_{11}$CH$_2$O(CH$_2$CH$_2$O)$_4$H] available under the trade name Lipal 3TD from Drew Chemicals Corp., the polyethoxylated fatty alcohols available under the trade names Emulphor ON870 and ON877 and Diazopon SS-837 from GAF Corp., and the tridecyloxypoly (ethyleneoxy) ethanol also available from GAF Corp. under the trade name Emulphogene BC-840.

The most desirable mixtures appear to be those containing approximately 49% Neutronyl 622 or Igepal RC-520, 49% Igepon TK-32, and 2% Emulphor ON-870.

Further, if desired, antifoaming agents, such as Dow–A, –B, –C and H-10, available from the Dow-Corning Corp., Midland, Mich., and G. E. 60, available from the Silicone Products Department, General Electric Corp., Waterford, N.Y., may also be included in the additive having, as its essential constituents, a starch and a mixture of an alkylphenyl polyethoxy alcohol, an N-substituted acid amide and an ethoxylated fatty alcohol, as described above. The concentration of such antifoaming agents may be in the range from 5 to 500 p.p.m.

The single view of the drawing schematically illustrates a venturi scrubber system that has been employed for determining the effectiveness of various scrubbing liquids in removing particulate matter from gaseous wastes.

As shown, the venturi scrubber system generally comprises a venturi scrubber 10 connected with a cyclone separator 11. A centrifugal blower 12 equipped with a damper for varying the air flow rate has its outlet connected with the inlet to scrubber 10 and the air thus delivered to the scrubber has particulate matter added thereto from a supply 13 by way of a variable speed powder feeder 14. The scrubbing liquid is contained in a tank 15 and is pumped therefrom by a pump 16 for discharge into scrubber 10 at one or more nozzles or weir boxes 17. The liquid flow rate is controlled by a valve 18 interposed in a by-pass extending from the outlet of pump 16 back to tank 15. A flow meter 19 measures the liquid flow rate to scrubber 10, and an airflow meter 20, for example, in the form of a pitot tube and associated manometer, measures the air flow rate to the scrubber. The venturi scrubber 10, for test purposes, is provided with a variable area throat and with suitable instrumentation for measuring the pressure drop across such throat. The liquid and particulate matter entrapped thereby are returned from separator 11 to tank 15 by way of return line 21, while the air and any particulate matter that is still carried thereby are exhausted from separator 11 through an exhaust duct 22. Isokinetic sampling units 23 and 24 of conventional construction are connected respectively to the line or duct carrying air laden with particulate matter to scrubber 10 to exhaust duct 22 for measuring the particulate loading of the air or gas before and after the treatment thereof in venturi scrubber 10 and cyclone separator 11.

The invention will now be further described with reference to the following illustrative examples employing a venturi scrubber system as described above:

Example 1

The described venturi scrubber system was operated with a water flow rate of 2.5 gal./min., an air flow rate of 252 cu. ft./min. and a pressure drop across the venturi throat of 20 inches water. The particulate matter was a powdered talc (magnesium silicate) available commercially from R. T. Vanderbilt Co. under the trade name Nytol 400 and was added to the air flow by feeder 14 so as to provide 3.7 grains of talc/cu. ft. air as measured by sampler 23. In order to simulate the conditions of continuous recirculation of the scrubbing liquid, the liquid in tank 15 was water containing 2% talc, by weight, that is, a slurry of talc in water.

(a) As a basis for comparison, the venturi scrubber system was operated with the scrubbing liquid consisting of the above mentioned slurry of talc in water, that is, without any additive according to this invention. Under the described conditions, the outlet loading of the air, that is, the amount of talc retained by the air in exhaust duct 22 and measured by sampler 24 was 0.09 grains/cu. ft. so that the venturi scrubber had an efficiency of 97.7%.

(b) Under the same conditions as recited above, the venturi scrubber was again operated, but with starch of the yucca plant dissolved in the 2% slurry of talc in water in a concentration of 300 p.p.m., and it was found that the outlet loadnig, that is, the amount of talc remaining in the air passing through duct 22, was reduced to 0.02 grains/cu. ft. so that the venturi scrubber had an efficiency of 99.4% with a scrubbing liquid having starch added thereto. The yucca starch used in this example was extracted from the tuberous root of the yucca or manioc plant by the simple procedure of peeling the root and then grinding or macerating the peeled root to a pulp which is washed with water on a screen to release or carry away the starch granules that were embedded in the root cells. The wash water is collected and allowed to settle, whereupon the supernatant water is removed leaving the yucca starch cake.

Example 2

The test described in parts (a) and (b) of Example 1 were repeated, but with the pressure drop across the throat of the venturi reduced to 10 inches of water. With the scrubbing liquid consisting of the slurry of talc in water, as in part (a) of Example 1, the efficiency of the venturi scrubber in removing talc from the air was 94.0% and, with the scrubbing liquid having added thereto 300 p.p.m. of the yucca starch, as in part (b) of Example 1, the efficiency was increased to 96.3%.

Example 3

The test of Example 1 were repeated, but with the particulate matter added to the air flow by feeder 14 being 5.7 grains/cu. ft. of iron oxide powder (Kroma Red from Charles Pfizer & Co., New York, N.Y.), having a particle size distribution between about 0.5 and 4.0 microns, which closely resembles the particulate matter generated at commercial steel furnace operations.

(a) With the scrubbing liquid consisting of water alone, the venturi scrubber had a collection efficiency of 97.9%.

(b) With the scrubbing liquid consisting of a solution in water of corn starch, such as is commercially available under the trade name Argo Gloss Starch, in a concentration of 300 p.p.m., the collection efficiency was increased to 99.2%.

(c) With the scrubbing liquid consisting of an aqueous solution of yucca starch, obtained as described in part (b) of Example 1, in a concentration of 300 p.p.m., the collection efficiency was further increased to 99.4%.

(d) Using the same scrubbing liquid as in part (c) above, but with the concentration of yucca starch therein increased to 600 p.p.m., the collection efficiency was increased to 99.5%.

(e) Reducing the concentration of the yucca starch in the scrubbing liquid to 60 p.p.m., still resulted in a collection efficiency of 99.1%, as compared with the collection efficiency of 97.9% for the water alone.

Example 4

The tests of Example 3 were repeated, but with the scrubbing liquid consisting of water having added thereto 300 p.p.m. of the yucca starch and also 300 p.p.m. of a mixture consisting of 49 wt. percent Igepal RC-520, 49 wt. percent Igepon TK-32 and 2 wt. percent Emulphor ON-870. The resulting collecting efficiency was 99.6%.

Example 5

Under the same conditions as are specified in Example 1(a), there were added to the talc slurry in tank 15 both yucca starch and sodium chloride (NaCl) in concentrations of 300 p.p.m. and 100 p.p.m., respectively, and the resulting collection efficiency was 99.5% as compared with the collection efficiency of 99.4% indicated in Example 1(b) for an addition of yucca starch alone in the concentration of 300 p.p.m.

Example 6

It will be noted that all of the foregoing Examples employed a water flow rate of 2.5 gal./min. and an air flow rate of 4.2 cu. ft./sec., giving a water to air flow rate ratio of about 10 gal. water/1000 cu. ft. air. In the present example, the water flow rate was 1.75 gal./min. and the air flow rate was maintained at 452 cu. ft./min., giving a water to air flow rate ratio of about 7.0 gal. water/1000 cu. ft. air. Otherwise, the conditions of this example were the same as in Example 1(a), that is, the particulate matter added to the air flow was talc introduced at a feed rate of 3.7 grans/cu. ft., the tank 15 contained a 2.0 wt. percent slurry of talc in water, and the pressure drop across the venturi throat was 20 inches water.

(a) With no additive introduced into the talc slurry, the collection efficiency was down to 97.1% from the 97.7% collection efficiency indicated in Example 1(a) for a water to air flow rate ratio of 10.0, as might be expected from a reduction in that ratio.

(b) With the addition to the slurry of yucca starch and sodium chloride (NaCl) in concentrations of 600 p.p.m. and 200 p.p.m., respectively, the collection efficiency was increased to 99.1%.

(c) With the addition to the talc slurry of yucca starch and calcium chloride ($CaCl_2$) in concentrations of 600 p.p.m. and 200 p.p.m., respectively, the collection efficiency was increased to 99.4%.

(d) With the addition to the talc slurry of yucca starch and potassium thiocyanate (KCNS) in concentrations of 600 p.p.m. and 200 p.p.m., respectively, the collection efficiency was increased to 99.5%.

Example 7

The described venturi scrubber system was operated with a water flow rate of 1.5 gal./min., an air flow rate of 155 cu. ft./min. and a pressure drop of 15 inches water. The particulate matter was a fly ash obtained from fuel oil combustion, and was added to the air flow by feeder 14 so as to provide 5 grains of fly ash/cu. ft. air.

(a) As a basis for comparison, the venturi scrubber system was operated with the scrubbing liquid consisting of water containing 10%, by weight, of 50% sodium sulfate ($Na_2SO_4$) and 50% sodium sulfite ($Na_2SO_3$). Under the described conditions, the venturi scrubber had an efficiency of 95.0%.

(b) Under the same conditions as recited above, the venturi scrubber was again operated, but with starch of the yucca plant dissolved, in a concentration of 600 p.p.m., in the salt water of part (a), and it was found that the venturi scrubber was again operated, but with starch of (c) When the scrubbing liquid was comprised of the salt water of part (a) and, added thereto, a mixture of 48 wt. percent Neutronyx 622, 48 wt. percent Igepon TK-32 and 2 wt. percent Emulphor ON-870, in a concentration of 600 p.p.m., the venturi scrubber had a collection efficiency of 98.2%.

(d) Finally, the venturi scrubber was operated, as above, but with a scrubbing liquid consisting of the salt water of part (a) to which there was added yucca starch, in the concentration of 600 p.p.m., and the mixture of part (c), also in the concentration of 600 p.p.m., and it was found that this scrubbing liquid provided the highest efficiency of 99.0%.

From the foregoing examples, it will be seen that scrubbing liquids constituted by water and, as an additive therein, either starch or a mixture of an alkyl- or dialkylphenyl polyethoxy alcohol, an N-substituted acid amide and an ethoxylated fatty alcohol, are capable of removing from the gas flow major proportions of the particulate matter that remains therein when using water alone as the scrubbing liquid. However, as is apparent from Examples 4 and 7(d) the highest particle collection efficiency is attained when, in accordance with this invention, the additive dissolved in water to form the scrubbing liquid contains both a starch and the mixture of an alkyl- or dialkylphenyl polyethoxy alcohol, an N-substituted acid amide and an ethoxylated fatty alcohol, and preferably also a salt.

Although low inlet grain loadings have been selected for the examples, that is, inlet grain loadings of 3.7 grains/cu. ft. to 5.7 grains/cu. ft., this has been done intentionally as low grain loadings represent the most disadvantageous operating conditions. Thus, the most critical test of a venturi scrubber or other wet collector is its ability to remove particulate matter from a gas flow when the concentration of particulate matter is extremely small. No real problem exists with respect to the removal of the bulk of the particulate matter from a gas flow that is rather heavily contaminated. The more serious problem is the removal of the small amount of particulate matter that has heretofore been left in the gas flow by existing wet collectors or other treatments, and this problem is advantageously attacked by the present invention.

Although the phenomenon by which the scrubbing liquid additives according to this invention improve the collection efficiency of wet collectors is not precisely understood, it is clear that the very substantial improvements realized cannot be attributed to any surfactant properties of such additives. Thus, for example, a 300 p.p.m. concentration of yucca starch in clear water results in a surface tension of 73.8 dynes/cm., while the same concentration of yucca starch in the 2% talc slurry results in a surface tension of 76.6 dynes/cm., both of which values are above the surface tension of water alone.

In order to demonstrate that, in that portion of the additives according to this invention constituted by the mixture of an alkyl- or dialkylphenyl polyethoxy alcohol, an N-substituted acid amide and an ethoxylated fatty alcohol, all three of those constituents are required for optimum results, the following examples are given:

Example 8

The described venturi scrubber system was operated with a scrubbing liquid consisting of water with 100 p.p.m. of an additive constituted by a mixture of Triton X-45, Super amide GR and DF-16 in proportions of 5:4:1, by weight. When the constituents of such additive were mixed together a reaction apparently occurred, as evidenced by a rise in temperature and change in pH. The particulate matter was a powdered limestone (97% calcium carbonate) available commercially under the tradename Vicron 25-11 from Pfizer, Minerals, Pigments and Metals Division, and was added to the air flow by feeder 14 so as to provide an inlet load of 32.4 grains of limestone/cu. ft. air as measured by sampler 23. The outlet loading of the air, that is, the amount of limestone, in grains/cu. ft. air, retained by the air in exhaust duct 22 was measured by sampler 24 for each run of the scrubber. The venturi scrubber was operated with various pressure drops and various air flow and water flow rates, as indicated in the below Table I, and, for each combination of operating conditions, runs were conducted with water alone as the scrubbing liquid and also with water and 100 p.p.m. of the additive as the scrubbing liquid for comparison purposes. The results of these tests were as follows:

TABLE I

| Air flow (cu. ft./sec.) | Water flow (gal./min.) | Pressure drop (inches) | Efficiency, percent [a] | | Relative improvement, percent [b] |
|---|---|---|---|---|---|
| | | | Water alone | With additive | |
| 2.52 | 1 | 7 | 96.4 | 97.6 | 50.0 |
| 2.52 | 2 | 8.5 | 96.7 | 97.8 | 50.0 |
| 2.52 | 3 | 10.5 | 97.9 | 98.6 | 50.0 |
| 5.04 | 1 | 8.0 | 96.2 | 97.4 | 50.0 |
| 5.04 | 2 | 9.0 | 96.5 | 97.7 | 52.2 |
| 2.52 | 1 | 16.0 | 97.4 | 98.4 | 62.5 |
| 2.52 | 1 | 17.0 | 97.6 | 98.65 | 78.0 |

[a] The values of efficiency given above were calculated as follows:
$$\text{Efficiency (percent)} = \frac{\text{Inlet load} - \text{outlet load}}{\text{Inlet load}} \times 100$$

[b] The values of relative improvement given above were calculated as follows:
$$\text{Relative improvement (percent)} = \frac{\text{(with efficiency add.)} - \text{(water efficiency alone)}}{100 - \text{Efficiency (with add.)}} \times 100$$

In order to demonstrate that the above indicated very substantial relative improvements in the efficiency of collection of the particulate matter are the result of the use of an additive which is constituted by a reactive mixture of an alkylphenyl polyethoxy alcohol, an N-substituted amide of a fatty acid and an ethoxylated fatty alcohol, and that such large relative improvements are not attainable with only one of those constitutents of the additive, the test runs indicated in Table I were repeated while using, as the scrubbing liquid, water having 100 p.p.m. of Triton X-45 dissolved therein. The results of these comparative tests are as follows:

TABLE II

| Air flow (cu. ft./sec.) | Water flow (gal./min.) | Pressure drop (inches) | Efficiency, percent | | Relative improvement, percent |
|---|---|---|---|---|---|
| | | | Water alone | With Triton X-45 | |
| 2.52 | 1 | 7.0 | 96.5 | 97.4 | 34.6 |
| 2.52 | 2 | 9.0 | 96.6 | 97.5 | 36.0 |
| 2.52 | 3 | 10.0 | 97.6 | 98.0 | 20.0 |
| 5.04 | 1 | 8.0 | 96.1 | 97.0 | 30.0 |
| 5.04 | 2 | 9.0 | 96.5 | 97.2 | 25.0 |
| 2.52 | 1 | 16.0 | 97.4 | 98.2 | 44.5 |
| 2.52 | 1 | 17.0 | 97.6 | 98.5 | 60.0 |

It will be apparent from the above that, under all the tested operating conditions, the relative improvement in the collection of particulate matter was substantially greater when using the combination or mixture of Triton X-45, Super Amide GR and DF-16 as the additive, than when using only Triton X-45 as the additive. Such improvement in the collection of particulate matter cannot be attributed to any difference between the surface active properties of the mixture or combination and of Triton X-45, as the surface tension of water containing 100 p.p.m. of Triton X-45 was measured to be 31.5 dynes/cm., and the surface tension of water containing 100 p.p.m. of the mixture of Triton X-45, Super Amide GR and DF-16 was measured to be 31.7 dynes/cm.

Example 9

In order to further demonstrate that the collection efficiencies are surprisingly reduced when any one of the constituents is removed from the additive that is a mixture of an alkylphenyl polyethoxy alcohol (Triton X-45), an N-substituted amide of a fatty acid (Super Amide GR) and an ethoxylated fatty alcohol (DF-16), the venturi scrubber was operated with the additive described in Example 1 under operating conditions (air flow=5.04 cu. ft./sec., water flow=1 gal./min., pressure drop=13 in.) providing a collection efficiency of 97.4% when using water alone, and also with additives in which one of the constituents of the additive mixture was omitted without reducing the total concentration of additive in the water. The results of these tests are given in the table below:

TABLE III

| Concentration of additive constituent in p.p.m. | | | Efficiency, percent | Relative improvement, percent |
|---|---|---|---|---|
| Triton X-45 | Super Amide GR | DF-16 | | |
| 50 | 40 | 10 | 98.4 | 62.5 |
| 50 | 50 | 0 | 98.0 | 30.0 |
| 50 | 0 | 50 | 97.9 | 23.8 |
| 0 | 50 | 50 | 98.0 | 30.0 |

From the above, it will be apparent that the relative improvement achieved when any one of the three constituents of the additive mixture is omitted is at least less than one-half that attained with the additive mixture containing all three constituents.

Example 10

In order to demonstrate that the three constituents included in the additive mixture should be preferably selected to react with each other, numerous combinations of various alkylphenyl polyethoxy alcohols identified in column A of Table IV below, various N-substituted amides of fatty acids identified in column B and various ethoxylated fatty alcohols identified in column C were mixed together in test tubes in the proportion 5:4:1 and were observed for evidence of reaction therebetween at room temperature. A reaction was considered to be evidenced by temperature change (either endothermic or exothermic), or changes in pH or in color and/or cloudiness. Of the various combinations thus tested, sixteen combinations showing no reaction and twenty-two combinations giving evidence of reaction were selected for use as additives to the water used as the collection liquid in the venturi scrubber, with the concentration of each additive being 100 p.p.m. In all of the tests indicated in Table IV below, the particulate matter to be removed was limestone (Vicron 25-11) fed at the same rate as Example 1, and the operating conditions of the scrubber were Air flow=2.52 cu. ft./sec., water flow=1 gal./min., and pressure drop=7 in. water, which results in an efficiency of 96.4% when using water alone.

TABLE IV

| A | B | C | Reaction | Efficiency, percent | Relative improvement, percent |
|---|---|---|---|---|---|
| Triton X-45 | Super Amide GR | DF-16 | Yes | 97.6 | 50.0 |
| Do | Super Amide L9 | DF-16 | Yes | 97.7 | 56.5 |
| Triton X-114 | Super Amide LM | DF-16 | No | 97.0 | 20.0 |
| Triton X-15 | do | DF-16 | No | 96.8 | 12.5 |
| Triton X-45 | do | DF-16 | No | 97.1 | 24.2 |
| Do | Super Amide L9C | DF-16 | No | 97.0 | 20.0 |
| Triton X-100 | Super Amide L9 | DF-16 | No | 97.0 | 20.0 |
| Triton N-101 | do | DF-16 | No | 97.0 | 20.0 |
| Triton X-100 | Super Amide LM | DF-16 | No | 97.0 | 20.0 |
| Triton X-45 | Syntol LM-90 | DF-16 | Yes | 97.6 | 50.0 |
| Triton N-57 | do | DF-16 | Yes | 97.6 | 50.0 |
| Triton X-45 | Syntol CN-60 | DF-16 | No | 97.0 | 20.0 |
| Triton N-57 | do | DF-16 | No | 96.9 | 16.1 |
| Do | Syntol L-90 | DF-16 | Yes | 97.8 | 63.6 |
| Triton X-45 | do | DF-16 | Yes | 98.1 | 89.0 |
| Do | Super Amide L9 | Lipal 4LA | No | 97.2 | 29.6 |
| Triton N-57 | do | do | No | 97.2 | 29.6 |
| Triton X-45 | do | Lipal 3TD | Yes | 98.1 | 89.0 |
| Triton N-57 | do | do | Yes | 97.6 | 50.0 |
| Triton X-45 | do | Lipal 2-OA | No | 97.2 | 29.6 |
| Triton N-57 | do | Lipal 4CSA | No | 97.3 | 33.4 |
| Triton X-45 | Super Amide L-9 | do | No | 97.2 | 29.6 |
| Triton N-57 | do | Lipal 2-OA | No | 97.4 | 38.5 |
| Hyonic PE-120 | Igepon T-73 | Emulphor ON-870 | Yes | 98.4 | 125.0 |
| Triton X-45 | do | do | Yes | 97.8 | 63.7 |
| Triton N-57 | do | do | Yes | 98.4 | 125.0 |
| Neutronyx 626 | do | do | Yes | 97.6 | 50.0 |
| Neutronyx 622 | Igepon T-73 | do | No | 97.2 | 28.6 |
| Triton X-45 | Igepon TK-32 | do | Yes | 98.0 | 80.0 |
| Neutronyx 622 | do | do | Yes | 98.5 | 140.0 |
| Triton N-57 | Igepon CN-42 | do | Yes | 98.0 | 80.0 |
| Hyonic PE-120 | Igepon TK-32 | do | Yes | 98.4 | 125.0 |
| Do | Hyonic LA-90 | do | Yes | 98.2 | 100.0 |
| Igepal RC-520 | Igepon TK-32 | do | Yes | 98.4 | 125.0 |
| Neutronyx 622 | do | Lipal 3TD | Yes | 98.2 | 100.0 |
| Do | do | Diazopon SS-837 | Yes | 98.5 | 140.0 |
| Do | do | Emulphogene BC-840 | Yes | 98.5 | 140.0 |
| Do | Super Amide GR | Emulphor ON-870 | Yes | 98.2 | 100.0 |

The constituents referred to in columns A, B and C above have been previously further identified or are further identified as follows:

Triton X–15, Triton X–100, Triton X–114 and Triton N–101 are commercially available products of Rhom & Haas Co., Philadelphia, Pa., of the general formula (I) and in which R and $n$ respectively represent $C_8H_{17}$ and 1; $C_8H_{17}$ and 9–10; $C_8H_{17}$ and 7–8; and $C_9H_{19}$ and 9–10.

Super Amide LM is a commercially available product of Onyx Chemical Corp. of the general formula (II) in which R is methyl lauric/myristic acid.

Syntol CN–60 is a commercially available product of Drew Chemical Corp. of the general formula (II) in which R is coconut acid.

Lipal 4LA, Lipal 2–OA, and Lipal 4C3A are commercially available products of Drew Chemical Corp. and are respectively ethoxylated lauryl alcohol $$[CH_3(CH_2)_{10}CH_2O(CH_2CH_2O)_5H],$$

ethoxylated oleyl alcohol $$[CH_3(CH_2)_7CH=CH(CH_2)_8O(CH_2CH_2O)_{21}H],$$

and ethoxylated cetyl/stearyl alcohol $$[CH_3(CH_2)_{14-16}CH_2O(CH_2CH_2O)_5H]$$

It is apparent from the results given in Table IV above that those sixteen combinations which did not give evidence of reacting upon mixing of the three constituents thereof provided relative improvements in the range from 12.5 to 38.5%, whereas the twenty-two combinations which gave evidence of reacting provided relative improvements in the range from 50.0 to 140.0%.

Example 11

The tests of Example 3 were repeated as to the combination of Neutronyx 622, Igepon TK–32 and Emulphor ON–870 shown in Table IV to provide the largest relative improvement, but with the relative amounts of the three constituents being varied, and the relative amounts of the three constituents and the results for each of these were as follows:

TABLE V

| Additive (p.p.m.) | | | Efficiency, percent | Relative improvement, percent |
| --- | --- | --- | --- | --- |
| Neutronyx 622 | Igepon TK–32 | Emulphor ON–870 | | |
| 50 | 40 | 10 | 98.5 | 140 |
| 40 | 50 | 10 | 98.3 | 112 |
| 40 | 10 | 50 | 97.4 | 40 |
| 10 | 40 | 50 | 95.6 | –18 |
| 85 | 5 | 10 | 97.6 | 50 |
| 5 | 85 | 10 | 97.6 | 50 |
| 10 | 5 | 85 | 95.4 | –22 |
| 35 | 35 | 30 | 98.0 | 80 |
| 48.5 | 48.5 | 2 | 98.6 | 157 |

From the results given in Table V, it is apparent that nearly equal amounts of Neutronyx 622 and Igepon TK–32, and low concentrations of Emulphor ON–870 give the best results, and further that large amounts of Emulphor ON–870 are detrimental, that is, will reduce the collection efficiency below that (96.4%) attainable with water alone as the scrubbing liquid. Further, the effectiveness of only 2% of Emulphor ON–870 in the additive resulting in the highest relative improvement of 157% indicates that such constituent acts either as a "catalyst" or as a coupling agent for the other two constituents although the precise nature of the reaction or interaction is not understood.

What is claimed is:

1. A scrubbing liquid for a wet collection apparatus removing particulate matter from gaseous wastes, consisting essentially of water and, dissolved in said water, a mixture of an alkyl- or dialkylphenyl polyethoxy alcohol, an N-substituted acid amide and an ethoxylated fatty alcohol all of which are selected to react with each other in said mixture, said alkylphenyl polyethoxy alcohol having the formula

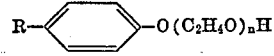

in which R is selected from $C_{8-9}H_{17-19}$ and $C_{12}H_{25}$ and $n$ has the numerical value of 4 to 12, and said N-substituted acid amide being selected from substances having one of the below formulas

in which R—CO is selected from the group consisting of the acyl groups of coconut, lauric, methyl lauric and myristic acids, and mixtures thereof, and

in which R—CO is selected from the group consisting of the acyl groups of coconut, oleic, palmitic, tall oil and tallow acids, and $R_1$ is selected from the group consisting of methyl and cyclohexyl groups, said ethoxylated fatty alcohol constituting approximately ½ to 40 wt. percent of said mixture, and said alkyl-or dialkylphenyl polyethoxy alcohol and N-substituted acid amide being present in said mixture in approximately equal molar amounts, said mixture being present in said water in a concentration between approximately 5 and 5000 p.p.m., and a starch also dissolved in said water in a concentration between approximately 5 and 5000 p.p.m.

2. A scrubbing liquid according to claim 1, in which said starch is a root starch.

3. A scrubbing liquid according to claim 1, in which said starch is a tapioca starch extracted from the root of the manioc plant.

4. A scrubbing liquid according to claim 1, in which said starch is present in concentration between approximately 50 and 1000 p.p.m.

5. A scrubbing liquid according to claim 1, in which there is further dissolved in said water a salt in a concentration between approximately 5 and 5000 p.p.m.

6. A scrubbing liquid according to claim 5, in which said salt has its anion selected from the group consisting of halides, halogenoid ions, sulfate, sulfite, nitrate and nitrite, and its cation is selected from Groups Ia, IIa, IIb and IIIb of the Periodic Table.

7. A scrubbing liquid according to claim 1, in which each of said alkyl- or dialkylphenyl polyethoxy alcohol and said N-substituted acid amide constitutes at least 35 wt. percent of said mixture.

8. A scrubbing liquid according to claim 1, in which said mixture concentration is between approximately 50 and 1000 p.p.m.

9. An additive for improving the particle collection efficiency of the scrubbing liquid in a wet collection apparatus removing particulate matter from gaseous wastes, comprising a starch, and a mixture of an alkyl- or dialkylphenyl polyethoxy alcohol, an N-substituted acid amide and an ethoxylated fatty alcohol all of which are selected to react with each other in said mixture, said alkylphenyl polyethoxy alcohol having the formula

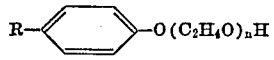

in which R is selected from $C_{8-9}H_{17-19}$ and $C_{12-25}$ and $n$ has the numerical value of 4 to 12, and said N-substituted acid amide being selected from substances having one of the below formulas

in which R—CO is selected from the group consisting of the acyl groups of coconut, lauric, methyl lauric and myristic acids, and mixtures thereof, and

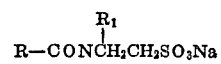

in which R—CO is selected from the group consisting of the acyl groups of coconut, oleic, palmitic, tall oil and tallow acids, and $R_1$ is selected from the group consisting of methyl and cyclohexyl groups, said ethoxylated fatty alcohol constituting approximately ½ to 40 wt. percent of said mixture, and said alkyl- or dialkylphenyl polyethoxy alcohol and N-substituted acid amide being present in said mixture in approximately equal molar amounts.

10. An additive according to claim 9, in which each of said alkyl- or dialkylphenyl polyethoxy alcohol and said N-substituted acid amide constitutes at least 35 wt. percent of said mixture.

11. An additive according to claim 9, in which said starch is a tapioca starch extracted from the root of the manioc plant.

12. An additive according to claim 9, further comprising a salt having its anion selected from the group consisting of halides, halogenoid ions, sulfate, sulfite, nitrate and nitrite, and its cation selected from Groups Ia, IIa, IIb and IIIb of the Periodic Table.

References Cited

UNITED STATES PATENTS

| | | | |
|---|---|---|---|
| 3,419,405 | 12/1968 | Lang | 106—211 |
| 3,692,552 | 9/1972 | Ruggeberg | 106—213 |

OTHER REFERENCES

Products Losses Cut with a Centrifugal Gas Scrubber, H. L. Storch Chem. Eng. Progress, vol. 62, No. 4, 1966.

THEODORE MORRIS, Primary Examiner